US008509541B2

(12) United States Patent
Tallamraju et al.

(10) Patent No.: US 8,509,541 B2
(45) Date of Patent: Aug. 13, 2013

(54) METHOD FOR EYE DETECTION FOR A GIVEN FACE

(75) Inventors: Ravindra Babu Tallamraju, Karnataka (IN); Subrahmanya Sreenivasan Venkateshaiah, Karnataka (IN); Mahalakshmi Kalmanje, Bellary (IN)

(73) Assignee: Infosys Limited, Bangalore, Karnataka (IN)

( * ) Notice: Subject to any disclaimer, the term of this patent is extended or adjusted under 35 U.S.C. 154(b) by 55 days.

(21) Appl. No.: 13/241,843

(22) Filed: Sep. 23, 2011

(65) Prior Publication Data

US 2012/0308142 A1    Dec. 6, 2012

(30) Foreign Application Priority Data

Jun. 6, 2011    (IN) .......................... 1912/CHE/2011

(51) Int. Cl.
*G06K 9/66*    (2006.01)

(52) U.S. Cl.
USPC .......................................... 382/195; 382/181

(58) Field of Classification Search
USPC .......................... 382/115, 118, 181, 195, 208
See application file for complete search history.

(56) References Cited

U.S. PATENT DOCUMENTS

| 7,197,165 | B2* | 3/2007 | Ryan | 382/103 |
| 2007/0071288 | A1* | 3/2007 | Wu et al. | 382/118 |
| 2007/0154095 | A1* | 7/2007 | Cao et al. | 382/190 |
| 2009/0034801 | A1* | 2/2009 | Hammoud | 382/107 |

* cited by examiner

*Primary Examiner* — Edward Park
(74) *Attorney, Agent, or Firm* — Occhiuti Rohlicek & Tsao LLP

(57) ABSTRACT

A method for detection of eye comprises computing an average inter-ocular distance for a given face. The method further comprises, detecting of a skin region of the given face. Furthermore, the method comprises identifying a search region for the given face. The method may also comprise computing an actual inter-ocular distance and computing eye centers of the given face.

11 Claims, 11 Drawing Sheets

METHOD FOR EYE DETECTION FOR A GIVEN FACE

TECHNICAL FIELD

The present disclosure relates to automatic eye detection in a given face image, more specifically to the efficiency and efficacy of the algorithm that makes of pattern clustering and search within a restricted region of a face.

BACKGROUND

Using textual Eye detection helps to identify eyes, other facial features with reference to eyes, face detection and geometrical methods of face recognition. It also helps as a preprocessing aid in achieving the large objective of face recognition. Multiple approaches for eye detection can be found in the literature. Some of the methods include modeling of geometrical structure, deformable templates and search methods; image processing approaches like multiple variants of edge detection, thresholding, filtering approaches, etc; pattern recognition approaches such as adaptive boosting (AdaBoost), k-means clustering, principal component analysis; projection functions and their many variants; hybrid methods, etc. Eye detection itself may not usually be the final objective. It helps to meet larger goals such as face detection or face recognition. In view of this, the activity is expected to be accurate, efficient with minimum requirement of iteration or search for solution. Eye detection methods have to handle one more of the following constraints as part of the solution or through preprocessing steps, viz., face rotation, scale, illumination, skin color, one or both eyes closed, etc. Limitations of existing methods include large amount of time and convergence to local minima while localizing eyes. It is desirable to arrive at a method that does not take exponential order of computation time and are devoid of false positives. Accordingly, there is a need for a technique that, proposes a method detected eyes irrespective of reasonable rotation, scaling, and change in illumination.

SUMMARY OF THE INVENTION

Aspects of the disclosure relates to a method to automatic eye detection in a given face image.

According to the one embodiment of the present disclosure, a method for detection of eye comprises computing an average inter-ocular distance for a given face. Computing an average inter-ocular distance for a given face is performed on a set of sample images. The method further comprises detecting of a skin region of the given face, wherein the given face is viewed as a two dimensional image. Furthermore, the method comprises, identifying a search region for the given face. Identifying the search region for the given face further includes, identifying a start line number and an end line number. A start pixel and an end pixel between the start line number and the end line number are identified and the pixels are clustered. The centroids are computed of each cluster and arranged in an ascending order of a set of gray values. The first three clusters which have a least gray value are selected and clustered to identify small regions of continuous gray scale. The method also comprises computing an inter cluster distance by considering cluster centroids. Further, the method comprises, identifying the distance between two clusters regions that is nearest to inter-eye distance by pre-chosen threshold.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The detailed description presented in the current section is intended to enable any person skilled in the art to make and use the invention, and is provided in the context of specific applications and their requirements. Necessary modifications to preferred embodiments will readily be apparent to those skilled in the art, and generic formulations defined herein may be applied to other embodiments and applications without departing from the spirit and scope of the invention. Moreover, in the following discussion, a number of details are set forth for the purpose of explanation. However one of the ordinarily skill in the art will realize that the invention could be practiced without the use of the above specific details. In other instances, well-known structures and devices are shown in block diagram form in order not to obscure the description of the invention with unnecessary detail. Thus the present is not intended to be limited to the embodiments shown, but is to be accorded the widest scope consistent with the principles and features disclosed herein.

Figure 1:
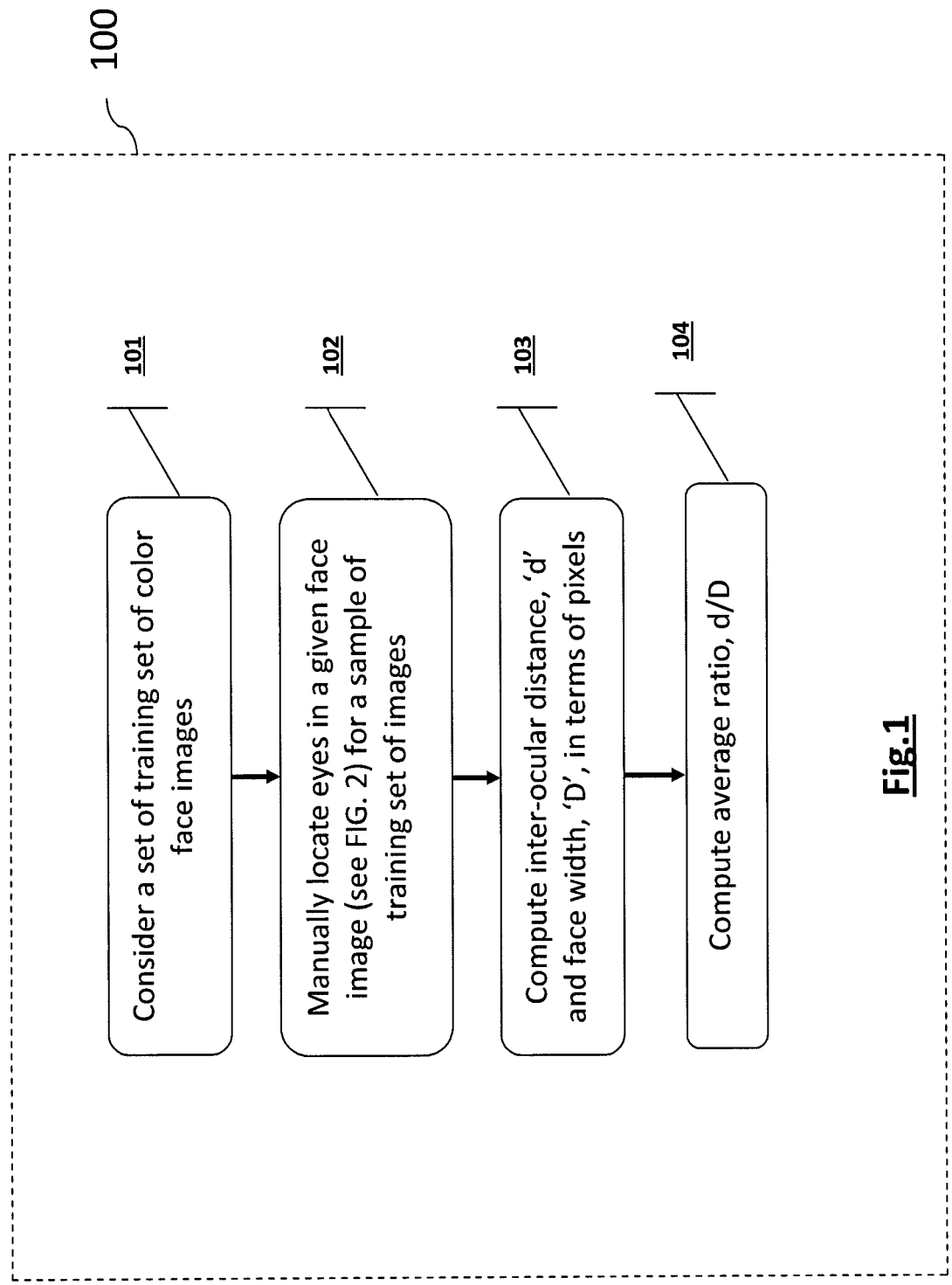
FIG. 1 is a flow chart illustrating the preprocessing step.
Figure 7:
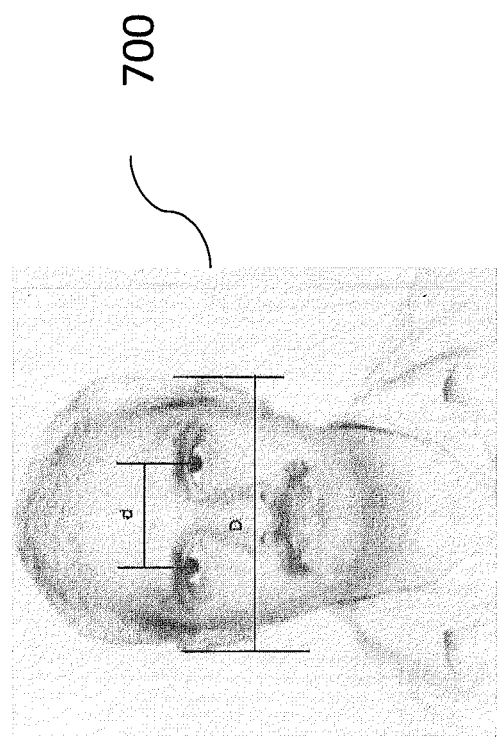
FIG. 7 is an embodiment of the present disclosure.

FIG. 1 is an illustrative drawing of preprocessing step. As noted in 101, consider a set of training color images. It should be noted that one assumption of the proposed work is that the input image for which eye detection is done for a moderate rotation of the image of about 25 degrees. Preprocessing step is required to compute some background information in an automated manner. It includes average inter-ocular distance. It is generally noted in inter-ocular distance remains nearly constant. In the preprocessing step inter-ocular distance and face width are computed by manually locating eyes in a vertically aligned set of images of common scale as noted in 102. It is measured in terms of number of pixels. In order to make the measure independent of image size/scale, we propose to compute ratio of inter-ocular distance, d to face width, D. FIG. 7 clearly shows a given image with markings of and 'D'. The same is summarized in 103. As noted in 104, compute average ratio, d/D as per the following equation.

Given di and Di for i=1, 2, ... k, where k is the number of training data images, $$\frac{\bar{d}}{D} = \sum_{i=1}^{k} \frac{d_i}{D_i}$$

Figure 2:
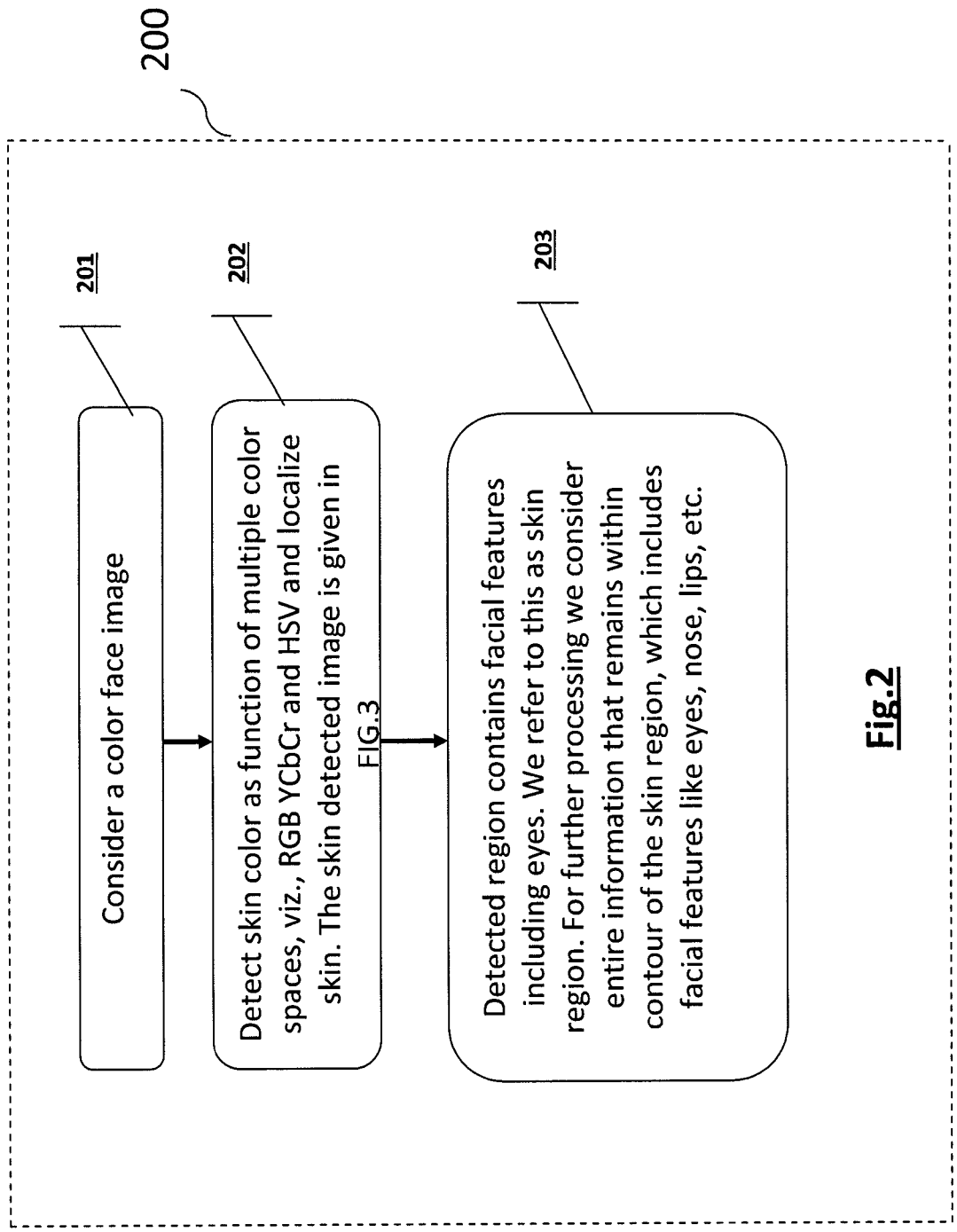
FIG. 2 is a flow chart illustrating the skin detection phase.
Figure 8:
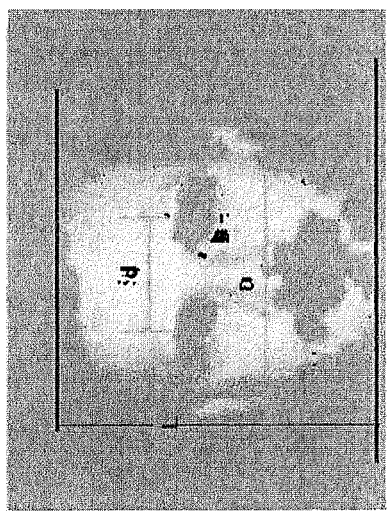
FIG. 8 is another embodiment of the present disclosure.

FIG. 2 is an illustrative drawing of skin detection phase. Consider color face image 201. There exist multiple color spaces to represent color images. Skin detection can be carried out using one or more than one color spaces. To detect skin color we make use of combination of color spaces, viz., RGB, YCbCr and HSV 202. The limits to different color species can be obtained through experimentation as well as existing literature. As shown in FIG. 8 the output of this step would be skin color detected image. Once the skin part of the image is detected, we consider complete internal part of the image within the skin contour in its original form by discarding non-skin part outside the skin contour 203.

Figure 3:
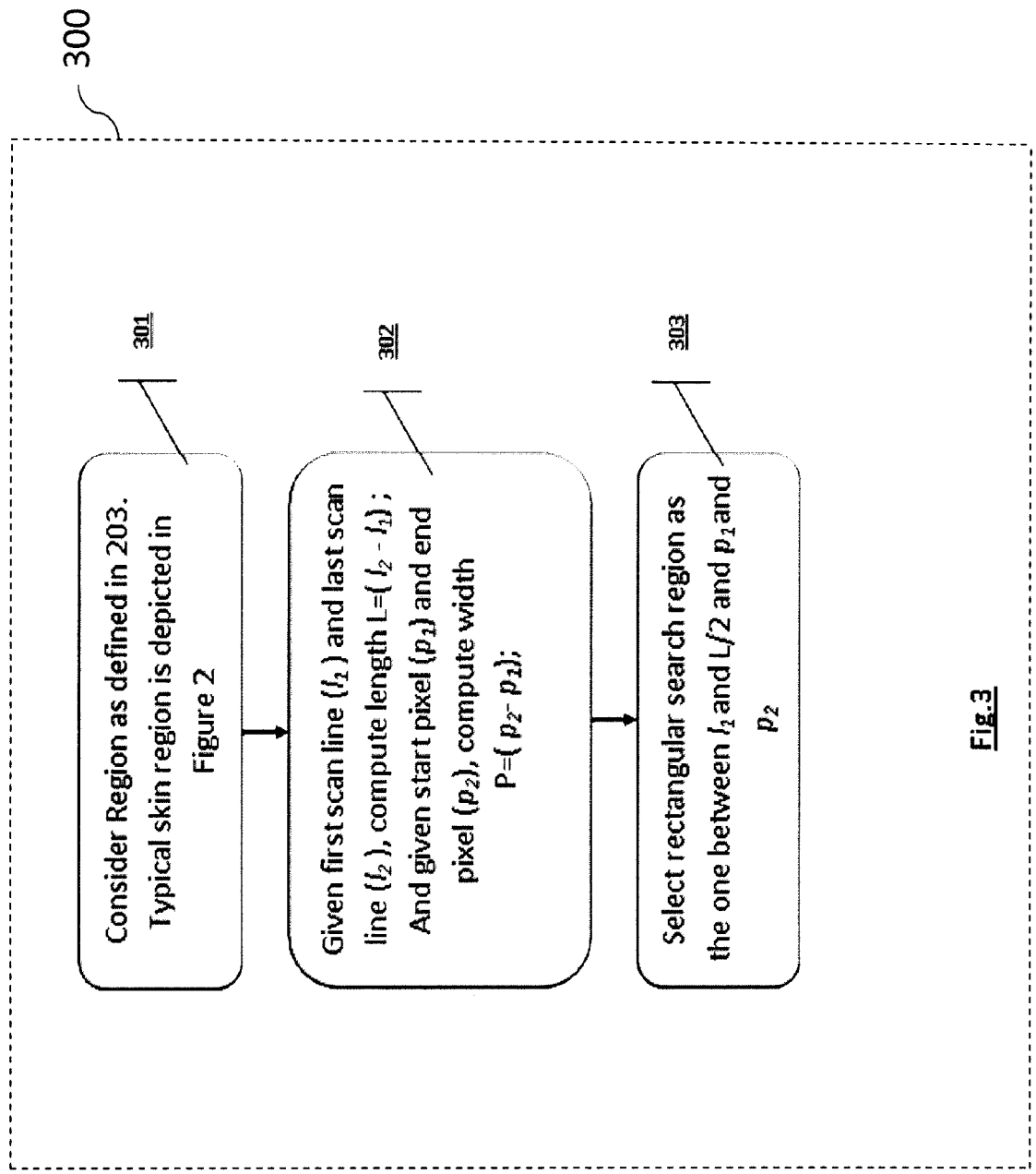
FIG. 3 is a flow chart illustrating the search region identification.
Figure 9:
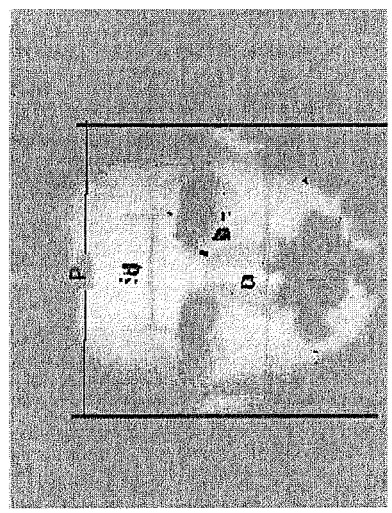
FIG. 9 is yet another embodiment of the present disclosure.

FIG. 3 is an illustrative drawing of search region identification. Consider the region as defined in 203 for search region identification, 301. Note the start line or first line of skin region as l1 and the last line as l2 as shown in FIG. 8, 302. Similarly note the start pixel p1 and end pixel p2 of the region of minimum and maximum possible skin color pixels as shown in FIG. 9. Compute length and width of the skin region image, through the following equations.

$L=(l_2-l_1)$ and $P=p_2-p_1$.

Select rectangular search region as half of the length of the image from the start line and width from p1 to p2, 303. It helps to reduce search region as well avoid distracting features.

Figure 4:
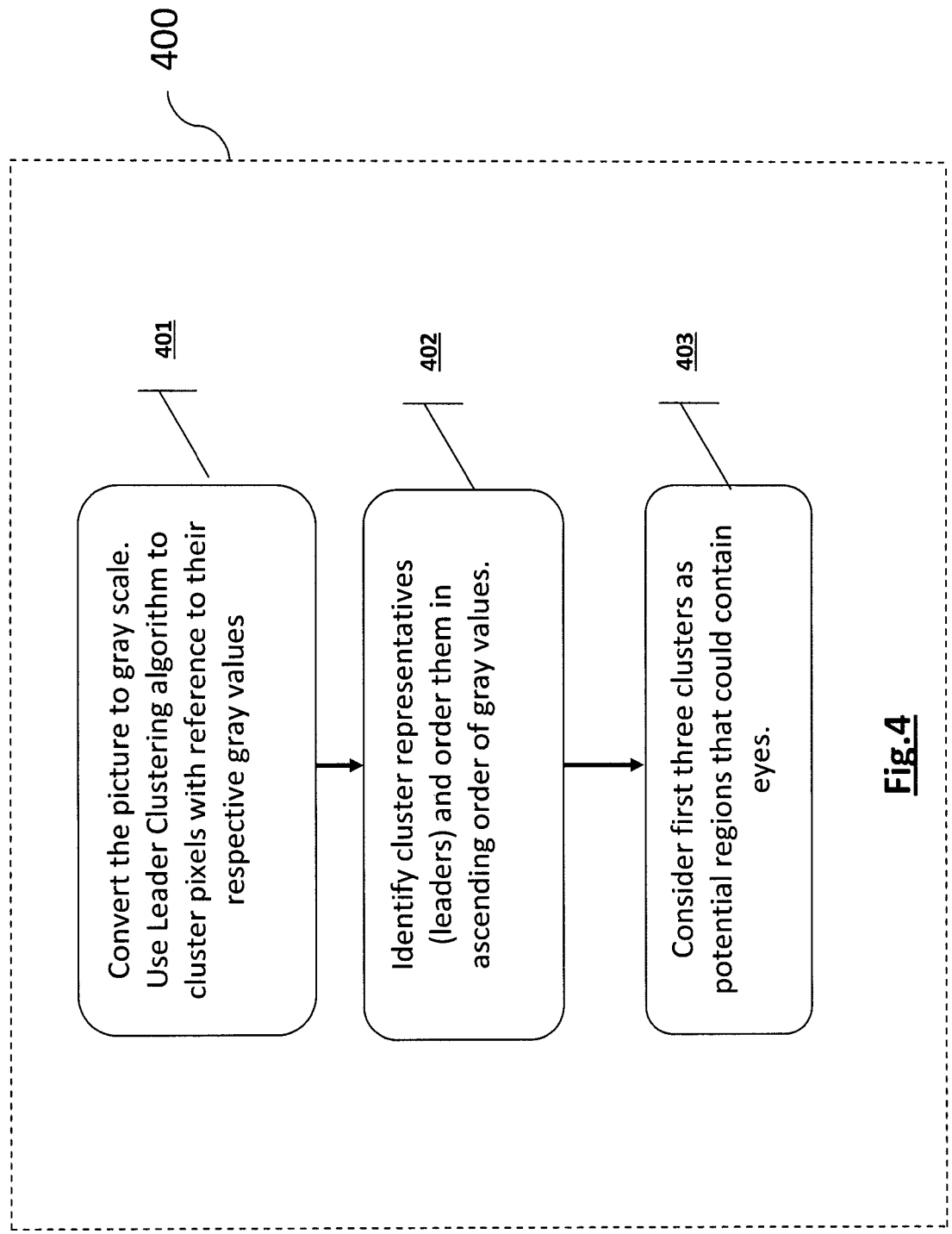
FIG. 4 is a flow chart illustrating clustering leading to localizing eye regions.

FIG. 4 is an illustrative drawing of clustering to localize eye regions. Leader clustering algorithm is used to for clustering. In order to proceed further, convert the considered image region to gray scale and cluster the image pixels with reference to their gray values 401. Thus the regions would contain pixels that might even be spatially separated. Identify leaders, which form cluster representatives. Order the leaders the thereby clusters in ascending order of their gray values 402. Consider first three clusters as potential regions that could contain eyes 403. Clustering threshold is arrived at after experimentation for a given scenario.

Figure 5:
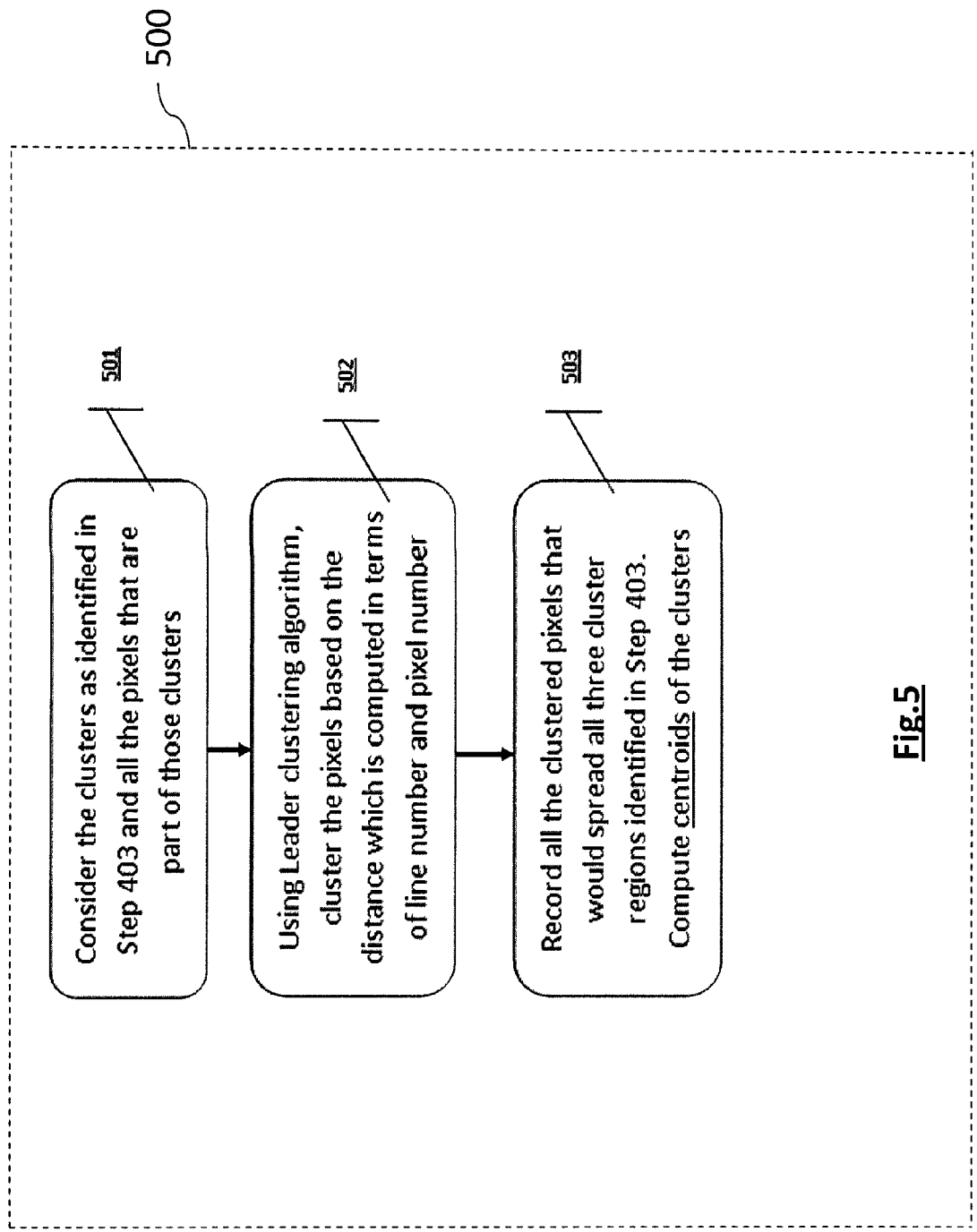
FIG. 5 is a flow chart illustrating clustering leading to potential eye candidates.

FIG. 5 is an illustrative drawing of clustering to identify candidates for eye. Large regions of possible eye regions are generated in 403. We consider all those pixels that are part of these clusters. They form patterns for further processing at this stage, 501. Here again, Leader clustering algorithm is used to cluster these pixels. However, similarity criterion at this stage is the distance in terms of line and pixel numbers as shown in 502. Thus all those potential eye regions that are in proximity are grouped together. The dissimilarity threshold for clustering is chosen based on experimentation. Once chosen, the threshold would remain constant for a given data set. Record all the clustered pixels. Compute centroids of all computed clusters 503 using following equation. Given the number of cluster constituents, n, centroid of pixels (xi, yi) is given by the following equation.

$$(\bar{x}, \bar{y}) = \left( \frac{1}{n} \sum_{i=1}^{n} x_i, \frac{1}{n} \sum_{i=1}^{n} y_i \right)$$

These clusters contain candidates for eye detection, with centroids as possible eye centers.

Figure 6:
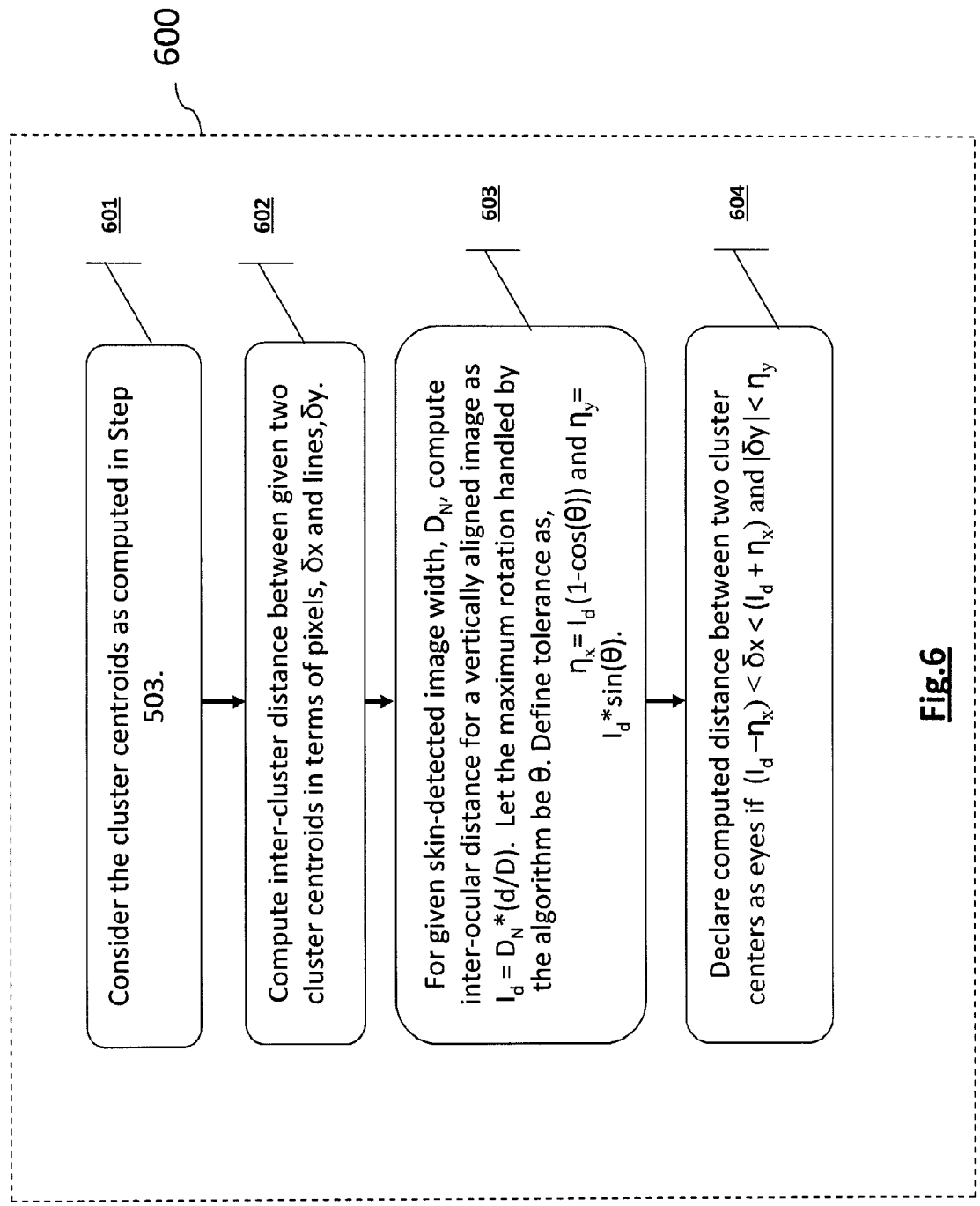
FIG. 6 is a flow chart illustrating procedure to identify eye cluster.

FIG. 6 is an illustrative drawing of identification of eyes. We consider cluster centroids computed in 503 for further processing, 601. The limit considered for this implementation is about 25 degrees. Given two cluster centroids, we compute distance in terms of pixels, δx and lines, δy, 602. In order to take care of scaling, we scale the average ratio, d/D as noted in 104. Given the width of image under consideration as DN, we compute inter-ocular distance of vertically aligned as Id=DN*(d/D). In order to localize possible eye candidates, we consider possible face image rotation by an angle, θ. Based on such possible rotation, consider maximum value of θ as 25 degrees. We compute tolerance in pixel and line directions, 603, as given below.

Figure 10:
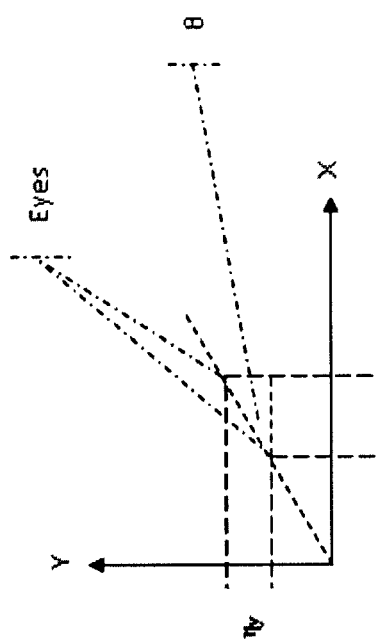
FIG. 10 is another embodiment of the present disclosure.

$\eta x = Id(1-\cos(\theta))$ and $\eta y = Id*\sin(\theta)$.

ηx, and ηy are depicted in FIG. 10

We compute limits in pixel and line directions and declare a pair of centroids as eyes, if it satisfies following inequalities, 604.

$(l_d - \eta_x) < \delta x < (l_d + \eta_x)$ and $|\delta y| < \eta_y$

The centroid pair forms eyes.

Figure 11:
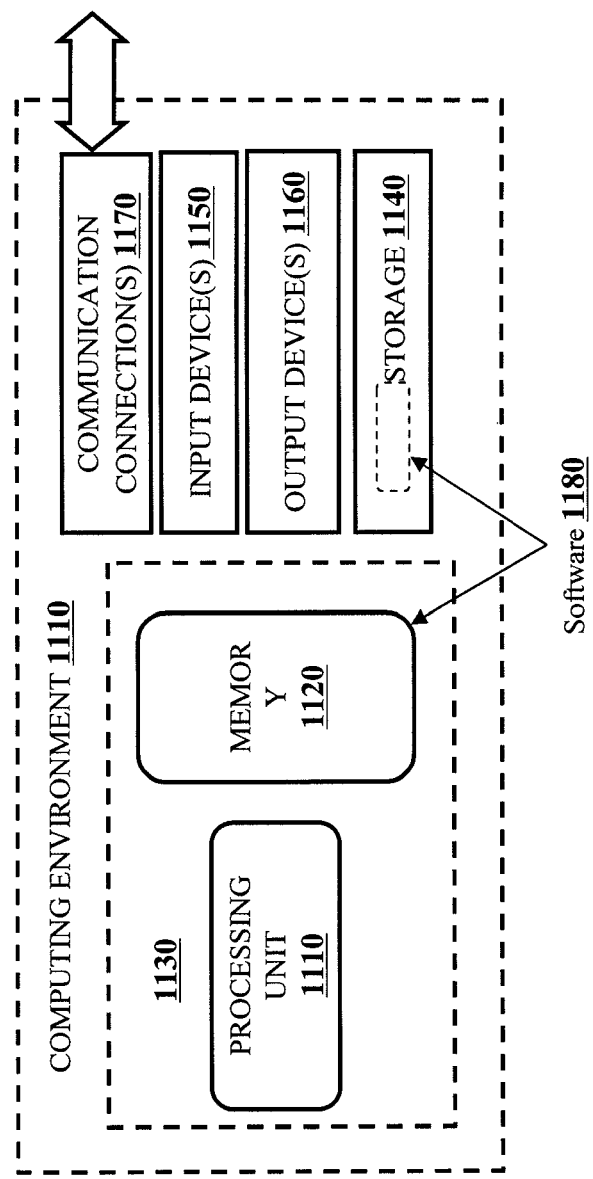
FIG. 11 is a system illustrating a generalized computer network arrangement, in accordance with an embodiment of the present invention.

One or more of the above-described techniques may be implemented in or involve one or more computer systems. FIG. 11 illustrates a generalized example of a computing environment 1100. The computing environment 1100 is not intended to suggest any limitation as to scope of use or functionality of described embodiments.

With reference to FIG. 4, the computing environment 1100 includes at least one processing unit 1110 and memory 1120. In FIG. 4, this most basic configuration 1130 is included within a dashed line. The processing unit 1110 executes computer-executable instructions and may be a real or a virtual processor. In a multi-processing system, multiple processing units execute computer-executable instructions to increase processing power. The memory 1120 may be volatile memory (e.g., registers, cache, RAM), non-volatile memory (e.g., ROM, EEPROM, flash memory, etc.), or some combination of the two. In some embodiments, the memory 1120 stores software 1180 implementing described techniques.

A computing environment may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which may be used to store information and which may be accessed within the computing environment 1100. In some embodiments, the storage 440 stores instructions for the software 1180.

The input device(s) 1150 may be a touch input device such as a keyboard, mouse, pen, trackball, touch screen, or game controller, a voice input device, a scanning device, a digital camera, or another device that provides input to the computing environment 1100. The output device(s) 1160 may be a display, a television, a hand held device, a head mounted display or a Kiosk that provides output from the computing environment 1100.

The communication connection(s) 1170 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 400, computer-readable media include memory 1120, storage 1140, communication media, and combinations of any of the above.

The sequence of instructions as explained in the method steps may include a program code adapted for computing an average inter-ocular distance for a given face. The sequence of instructions also includes program code adapted for detecting of a skin region of the given face. Furthermore, the sequence of further comprises, program code adapted for identifying a search region for the given face. The sequence of instructions may also comprise program code adapted for computing an actual inter-ocular distance. The sequence of instructions may also comprise program code adapted for computing eye center of the given face. The computer program product may further comprise program code adapted for identifying a start line number and an end line number. The sequence of instructions further comprises, program code adapted for identifying a start pixel and an end pixel between the start line number and the end line number. In continuation, the sequence of instructions may further comprise program code adapted for clustering the pixels and computing centroids of each cluster.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method for detection of an eye, the method comprising: computing an average inter-ocular distance for a given face; detecting a skin region of the given face; identifying a search region for the given face; computing an actual inter-ocular distance; and computing eye centers of the given face, wherein identifying the search region for the given face further includes identifying a start line number and an end line number, identifying a start pixel and an end pixel between the start line number and the end line number, clustering the pixels and computing centroids of each cluster, and arranging the centroids of the cluster in an ascending order of a set of gray values.

2. The method of claim 1, wherein computing an average inter-ocular distance for a given face is performed on a set of sample images.

3. The method of claim 1, wherein the given face is viewed as a two dimensional image.

4. The method of claim 1, further comprising selecting a first three clusters that have a least gray value.

5. The method of claim 4, further comprising clustering the three clusters to identify small regions of continuous gray scale.

6. The method of claim 1, further comprising computing an inter cluster distance by considering cluster centroids.

7. The method of claim 1, wherein computing eye centers of the given face is performed by identifying the distance between two clusters regions that is nearest to an inter-eye distance by a pre-chosen threshold.

8. A non-transitory computer-readable medium having encoded thereon instructions for enabling a processor to perform the operations of: computing an average inter-ocular distance for a given face; detecting a skin region of the given face; identifying a search region for the given face; identifying a start line number and an end line number; identifying a start pixel and an end pixel between the start line number and the end line number; clustering the pixels and computing centroids of each cluster; arranging the centroids of the cluster in an ascending order of a set of gray values; computing an actual inter-ocular distance; and computing eye centers of the given face.

9. The computer program product of claim 8, wherein the instructions further comprise instructions for enabling a processor to perform the operation of selecting a first three clusters that have a least gray value.

10. The computer program product of claim 9, wherein the instructions further comprise instructions for enabling a processor to perform the operation of clustering the three clusters to identify small regions of continuous gray scale.

11. The computer program product of claim 8, wherein the instructions further comprise instructions for enabling a processor to perform the operation of computing an inter-cluster distance by considering cluster centroids.

* * * * *